United States Patent
Higo et al.

(10) Patent No.: US 11,172,053 B2
(45) Date of Patent: Nov. 9, 2021

(54) TRANSFER APPARATUS, TRANSFER METHOD, AND PROGRAM FOR TRANSPORTING DATA FROM A SINGLE SOURCE TO SINKS WITH DIFFERENT COMMUNICATION REQUIREMENTS

(71) Applicant: NIPPON TELEGRAPH AND TELEPHONE CORPORATION, Chiyoda-ku (JP)

(72) Inventors: Naoki Higo, Musashino (JP); Ryota Ishibashi, Musashino (JP); Toshimitsu Tsubaki, Yokohama (JP); Yoshiko Sueda, Musashino (JP); Masao Aihara, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 89 days.

(21) Appl. No.: 16/480,058

(22) PCT Filed: Jan. 11, 2018

(86) PCT No.: PCT/JP2018/000420
§ 371 (c)(1),
(2) Date: Jul. 23, 2019

(87) PCT Pub. No.: WO2018/142866
PCT Pub. Date: Aug. 9, 2018

(65) Prior Publication Data
US 2019/0373085 A1    Dec. 5, 2019

(30) Foreign Application Priority Data
Feb. 6, 2017    (JP) .............................. JP2017-019890

(51) Int. Cl.
H04L 29/06        (2006.01)
H04L 12/801       (2013.01)
H04L 12/861       (2013.01)

(52) U.S. Cl.
CPC .............. *H04L 69/16* (2013.01); *H04L 47/34* (2013.01); *H04L 49/90* (2013.01)

(58) Field of Classification Search
CPC .......... H04L 69/16; H04L 47/34; H04L 49/90
See application file for complete search history.

(56) References Cited

U.S. PATENT DOCUMENTS

| 2014/0237072 A1* | 8/2014 | Satoh | H04L 69/16 709/217 |
| 2017/0012861 A1* | 1/2017 | Blumenthal | H04L 67/28 |
| 2017/0063498 A1* | 3/2017 | Resh | H04L 1/1635 |

FOREIGN PATENT DOCUMENTS

| JP | 2002-290400 A | 10/2002 |
| JP | 2004-252884 A | 9/2004 |
| JP | 2014-158241 A | 8/2014 |

OTHER PUBLICATIONS

International Search Report dated Feb. 27, 2018 in PCT/JP2018/000420 filed Jan. 11, 2018.
(Continued)

*Primary Examiner* — Ricky Q Ngo
*Assistant Examiner* — Stephen N Steiner
(74) *Attorney, Agent, or Firm* — Oblon, McClelland, Maier & Neustadt, L.L.P.

(57) ABSTRACT

In one aspect of the present invention, a transfer apparatus includes a reception unit configured to receive a packet from a source which distributes data according to a transmission control protocol (TCP); a storage unit configured to store data included in the received packet in a buffer based on a TCP sequence number of the received packet; a TCP transfer unit configured to transfer the received packet to a first sink
(Continued)

which requests distribution according to the TCP; and a UDP transfer unit configured to read the data from the buffer and transfer the read data to a second sink which requests distribution according to a user datagram protocol (UDP).

4 Claims, 9 Drawing Sheets

(56) References Cited

OTHER PUBLICATIONS

ISO/IEC 20922, OASIS MQTT Version 3.1.1 Plus Errata 01 OASIS Standard Incorporating Approved Errata 01, Dec. 10, 2015, pp. 1-81.
Fenner, B. et al., "Protocol Independent Multicast—Sparse Mode (PIM-SM) : Protocol Specification (Revised)," Internet Engineering Task Force (IETF), RFC 7761, STD: 83, Obsoletes: 4601, Category: Standards Track, ISSN: 2070-1721, Mar. 2016, pp. 1-137.

* cited by examiner

TRANSFER APPARATUS, TRANSFER METHOD, AND PROGRAM FOR TRANSPORTING DATA FROM A SINGLE SOURCE TO SINKS WITH DIFFERENT COMMUNICATION REQUIREMENTS

TECHNICAL FIELD

The present invention relates to a transfer apparatus, a transfer method, and a program.

BACKGROUND ART

Transport protocols such as a transmission control protocol (TCP) and a user datagram protocol (UDP) are used over an Internet Protocol (IP) network.

The TCP is a reliable protocol because of the capability of retransmission control or the like. While the UDP does not have a scheme of ensuring reliability, the UDP is a protocol with simple processing and with less delay.

In order to distribute video from a single source (for example, a security camera) to a plurality of sinks (for example, viewers), a distribution scheme using a TCP-based PUB/SUB model (see Non-Patent Document 1) and a UDP-based multicast scheme (see Non-Patent Document 2) have been proposed.

PRIOR-ART DOCUMENTS

Non-Patent Documents

[Non-Patent Document 1] ISO/IEC 20922, 10 Dec. 2015
[Non-Patent Document 2] IETF RFC 7761, March 2016

DISCLOSURE OF INVENTION

Problem(s) to be Solved by the Invention

Conventionally, TCP-based distribution is used for a sink which requires high-quality video without noise, and UDP-based distribution is used for a sink which requires real-time stream video.

However, when there are a sink with a high-quality communication requirement according to TCP-based distribution and a sink with a real-time communication requirement according to UDP-based distribution, a source for the sink and a source for the sink are separately needed. It is not possible to appropriately transfer data on a transport layer from a single source to sinks with different communication requirements.

It is an object of the present invention to transfer data on a transport layer from a single source to sinks with different communication requirements.

Means for Solving the Problem(s)

In one aspect of the present invention, there is provision for a transfer apparatus, including:
a reception unit configured to receive a packet from a source which distributes data according to a transmission control protocol (TCP);
a storage unit configured to store data included in the received packet in a buffer based on a TCP sequence number of the received packet;
a TCP transfer unit configured to transfer the received packet to a first sink which requests distribution according to the TCP; and
a UDP transfer unit configured to read the data from the buffer and transfer the read data to a second sink which requests distribution according to a user datagram protocol (UDP).

In another aspect of the present invention, there is provision for a transfer method in a transfer apparatus for transferring data from a source which distributes data according to a transmission control protocol (TCP) to a plurality of sinks which process the distributed data, including steps of:
receiving a packet from the source;
storing data included in the received packet in a buffer based on a TCP sequence number of the received packet;
transferring the received packet to a first sink which requests distribution according to the TCP; and
reading the data from the buffer and transferring the read data to a second sink which requests distribution according to a user datagram protocol (UDP).

In another aspect of the present invention, there is provision for a program for causing a computer to function as each unit of the transfer apparatus.

Advantageous Effect of the Invention

According to the present invention, it is possible to transfer data on a transport layer from a single source to sinks with different communication requirements.

DETAILED DESCRIPTION OF THE PREFERRED EMBODIMENTS

Embodiments of the present invention are described below with reference to the drawings.

<Overall Configuration of Data Distribution System>

Figure 1:
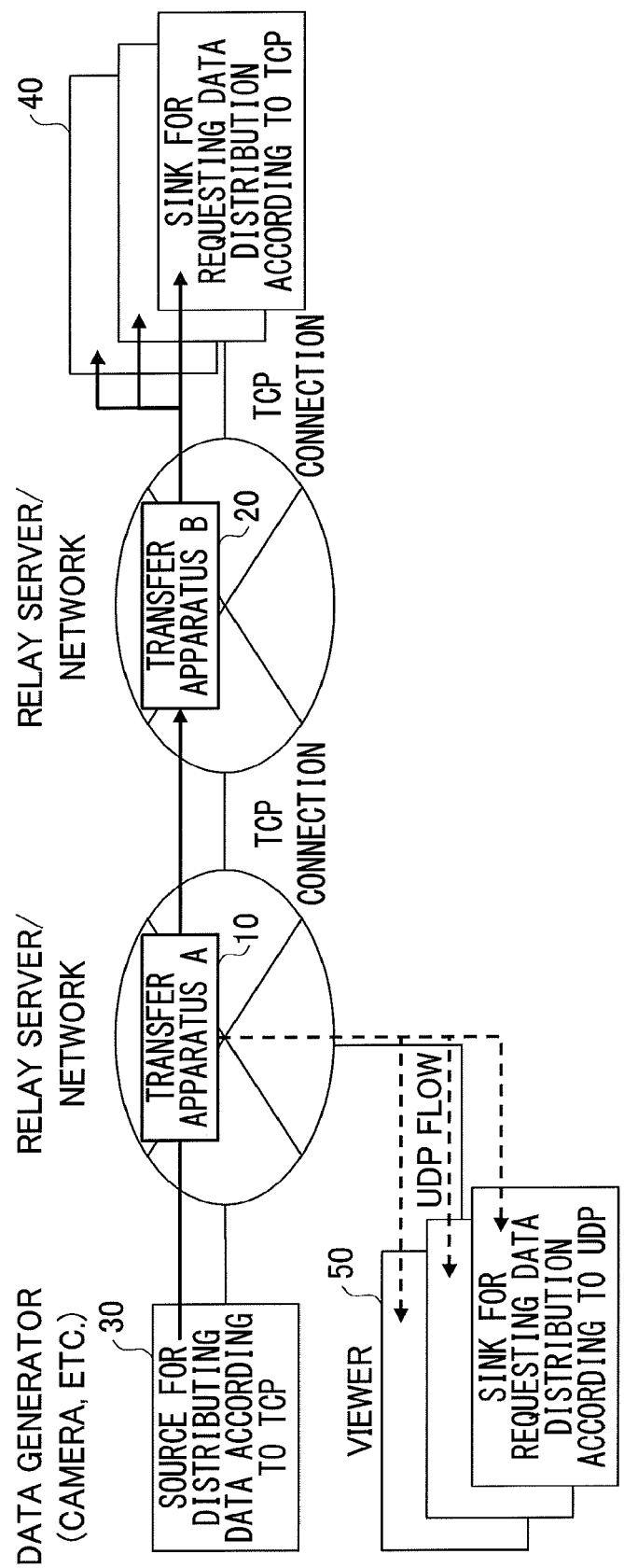
FIG. 1 is a diagram illustrating an overall configuration of a data distribution system according to an embodiment of the present invention.

FIG. 1 is a diagram illustrating an overall configuration of a data distribution system according to an embodiment of the present invention. The data distribution system includes a transfer apparatus A 10, a transfer apparatus B 20, a source 30, one or more sinks 40, and one or more sinks 50. They are connected using a communication path that may be subject to packet loss.

The source 30 is an apparatus (source node) that distributes data such as video according to the TCP. For example, the source 30 may be a camera, a video distribution server, or the like. The source 30 may be formed by a plurality of apparatuses such as a combination of a camera and a video distribution server.

The sink 40 is an apparatus (destination node) with a high-quality communication requirement, and requests data distribution from the source 30 according to the TCP to process (for example, display, analyze, or store) the received data. The sink 50 is an apparatus (destination node) with a real-time communication requirement, and requests data distribution from the source 30 according to the UDP to process (for example, display, analyze, or store) the received data. For example, each of the sinks 40 and 50 may be a viewer or the like. Each of the sinks 40 and 50 may be formed by a plurality of apparatuses such as a combination of a viewer and a video reproduction server.

The transfer apparatus A 10 is located between the source 30 and the transfer apparatus B 20 which transfers a packet to the sink 40. The transfer apparatus A 10 also transfers data received from the source 30 to the sink 50. In order to transfer data to the sinks 40 and 50 with different communication requirements, the transfer apparatus A 10 mirrors data distributed according to the TCP without terminating a connection. The transfer apparatus A 10 transfers the received packet to the sink 40 without modification and transfers the received packet to the sink 50 by arranging it for communication according to the UDP.

Specifically, in order to transfer data to the sink 50, the transfer apparatus A 10 temporarily stores data included in the received packet in a ring buffer based on a TCP sequence number of the received packet. When it is determined that there is data that has not been received yet based on the TCP sequence number, the transfer apparatus A 10 stores loss information indicating existence of data that has not been received yet. Arrangement of the received packet for communication according to the UDP is implemented by reading data from the ring buffer and transferring the data. When the loss information is stored, the transfer apparatus A 10 reads data received before the loss information from the ring buffer. If data corresponding to the loss information is not received even after waiting a predetermined period of time, the transfer apparatus A 10 abandons reception of the data corresponding to the loss information and starts reading data received after the loss information. In the embodiment of the present invention, a ring buffer is used in the transfer apparatus A 10. However, a buffer used for arranging the received packet for communication according to the UDP is not limited to a ring buffer but may be another type of buffer.

The transfer apparatus B 20 connects to the source 30 according to the TCP and transfers a packet received from the source 30 to a destination apparatus. When the transfer apparatus B 20 needs to transfer a packet to the sink 40 which requests distribution according to the TCP, the transfer apparatus B 20 can terminate a TCP connection to the source 30, establish a TCP connection to the sink 40, and transfer the packet to the sink 40.

A communication procedure in the data communication system is described below.

Figure 2:
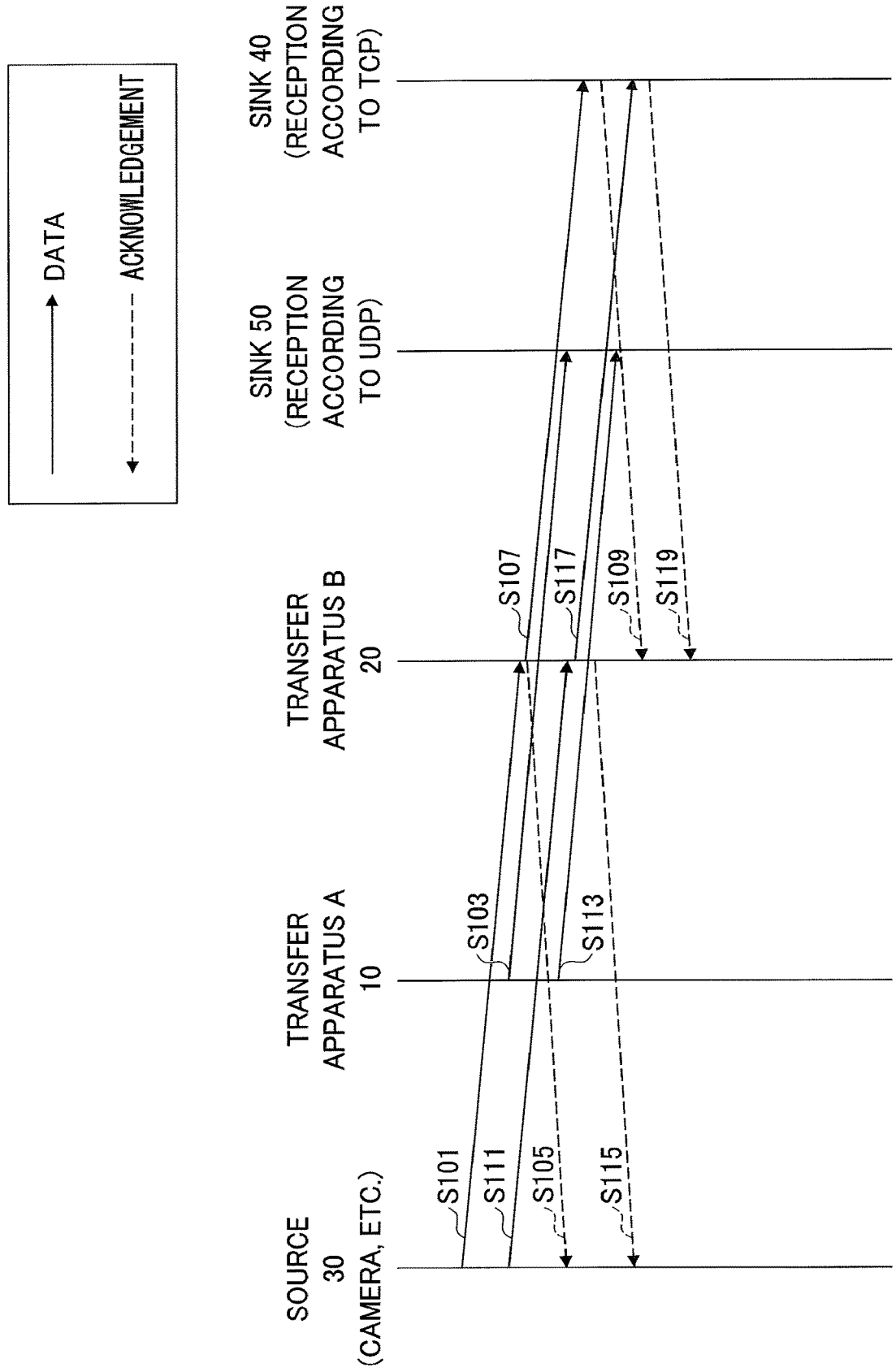
FIG. 2 is a sequence diagram of a communication procedure in a data distribution system according to an embodiment of the present invention (during normal operation).

FIG. 2 is a sequence diagram of a communication procedure during normal operation.

The source 30 distributes data to the transfer apparatus B 20 according to the TCP (S101). The transfer apparatus A 10 located between the source 30 and the transfer apparatus B 20 stores the data included in a received packet in a ring buffer based on a TCP sequence number without terminating a connection, reads the data from the ring buffer, and transfers the data to the sink 50 which requests distribution according to the UDP (S103). The transfer apparatus A 10 can transfer the data to a plurality of sinks.

When the transfer apparatus B 20 receives a packet, the transfer apparatus B 20 transmits an acknowledgement indicating next data to be received to the source 30 (S105) and transfers the packet to the sink 40 (S107). The transfer apparatus B 20 can transfer the packet to a plurality of sinks 40. When the sink 40 receives the packet, the sink 40 transmits an acknowledgment indicating next data to be received to the transfer apparatus B 20 (S109).

When the source 30 transmits next data, the data are distributed in the same manner (S111-S119).

Figure 3:
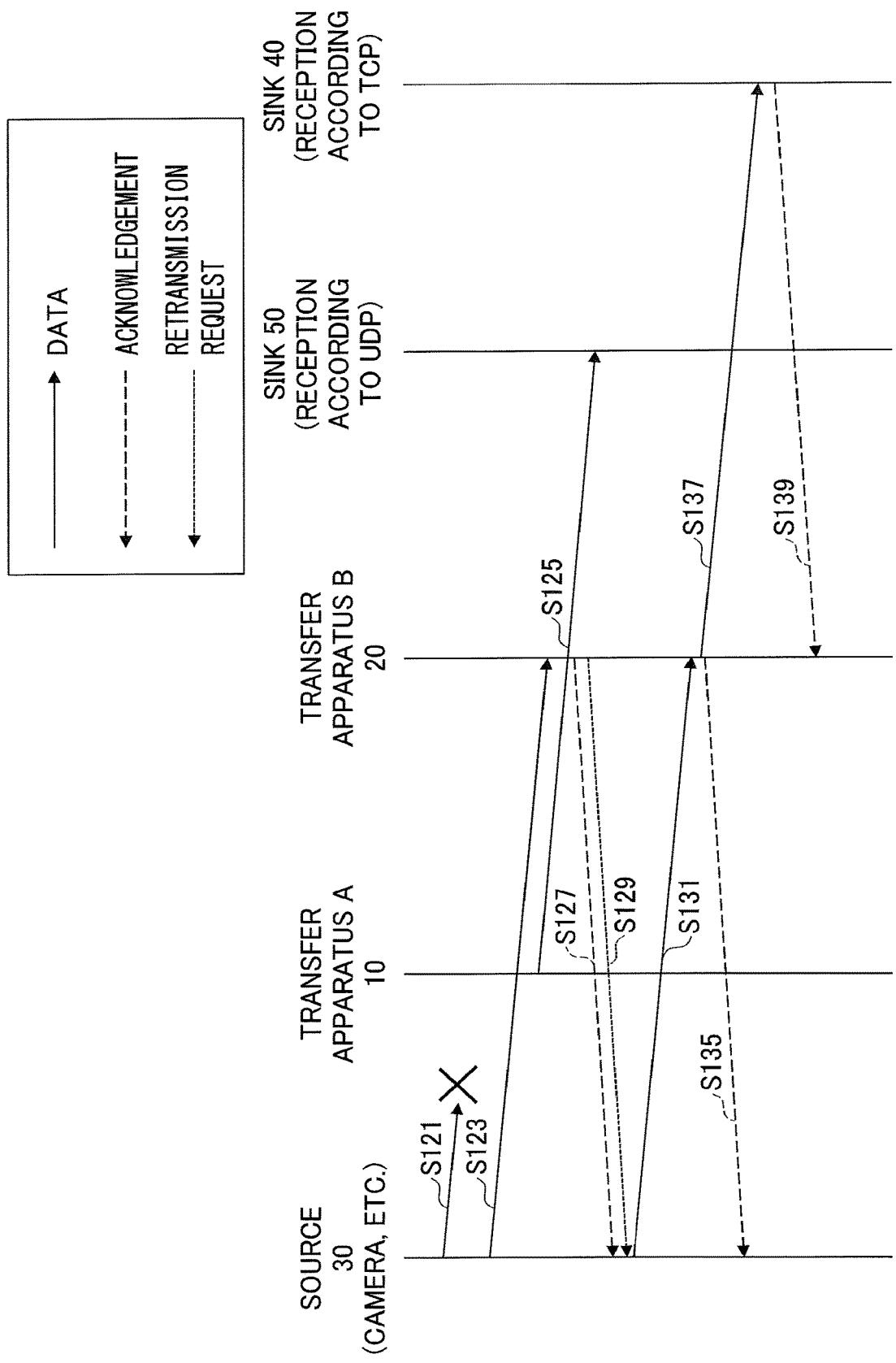
FIG. 3 is a sequence diagram of a communication procedure in a data distribution system according to an embodiment of the present invention (in the case of packet loss).

FIG. 3 is a sequence diagram of a communication procedure in the case of packet loss.

It is assumed that packet loss occurs while the source 30 distributes data (S121). The source 30 distributes next data to the transfer apparatus B 20 (S123). Since the transfer apparatus A 10 stores data in the ring buffer based on a TCP sequence number, the transfer apparatus A 10 can identify that there is data that has not been received yet. The transfer apparatus A 10 stores loss information and waits a predetermined period of time to receive the data that has not been received yet. When the transfer apparatus A 10 cannot receive the data even after waiting the predetermined period of time, the transfer apparatus A 10 reads data from the ring buffer and transfers the data to the sink 50 (S125).

When the transfer apparatus B 20 receives a packet, the transfer apparatus B 20 can identify, based on a TCP sequence number, that there is data that has not been received yet. The transfer apparatus B 20 transmits an acknowledgement indicating received data to the source 30 (S127) and transmits a retransmission request for the data that has not been received yet to the source 30 (S129).

The source 30 retransmits a packet in response to the retransmission request (S131). When the transfer apparatus B 20 receives the packet according to the retransmission request, the transfer apparatus B 20 transmits an acknowledgement indicating next data to be received to the source 30 (S135) and transfers the packet to the sink 40 (S137). When the sink 40 receives the packet, the sink 40 transmits an acknowledgment indicating next data to be received to the transfer apparatus B 20 (S139). When the packet transmitted in response to the retransmission request arrives at the transfer apparatus A 10 during waiting for the packet, the transfer apparatus A 10 can transfer data included in the packet to the sink 50 (not shown).

<Configuration and Operation of Transfer Apparatus>

Figure 4:
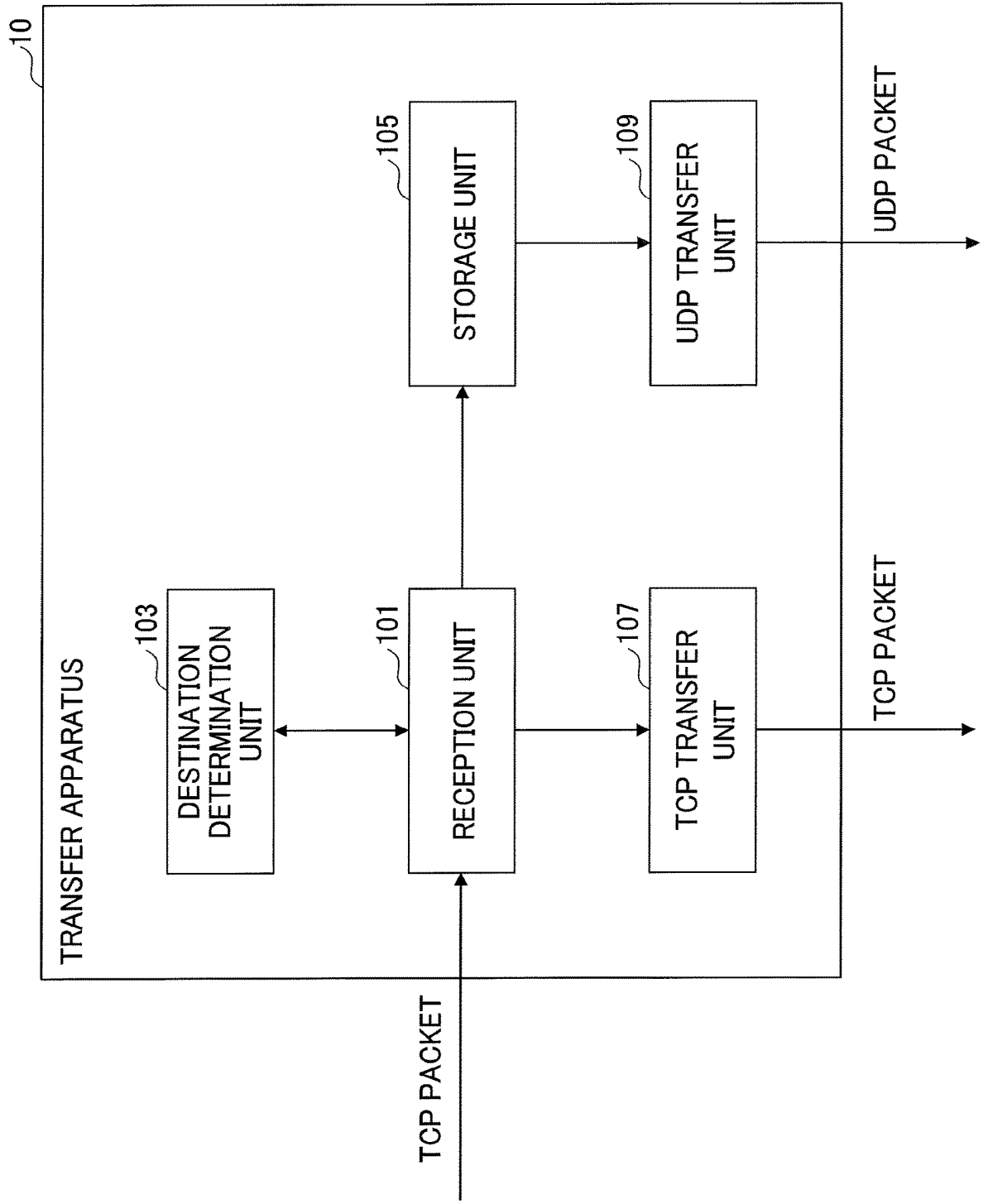
FIG. 4 is a block diagram illustrating a functional configuration of a transfer apparatus according to an embodiment of the present invention.

FIG. 4 is a block diagram illustrating a functional configuration of a transfer apparatus 10 according to an embodiment of the present invention. The transfer apparatus 10 includes a reception unit 101, a destination determination unit 103, a storage unit 105, a TCP transfer unit 107, and a UDP transfer unit 109.

The reception unit 101 receives a packet transmitted from the source 30. The reception unit 101 also receives a data distribution request transmitted from each of the sinks 40 and 50 to the source 30.

The destination determination unit 103 determines a destination of data, that is, the sinks 40 and 50. When each of the sinks 40 and 50 transmits the data distribution request to the source 30, the destination determination unit 103 stores address information of the source 30 and address information of the sinks 40 and 50 in a list or the like. When the reception unit 101 receives data from the source 30, the destination determination unit 103 can determine that the sinks 40 and 50 are destinations of the data by referring to the stored address information.

The storage unit 105 stores data included in the received packet in a ring buffer based on a TCP sequence number of the received packet. A ring buffer storage process in the storage unit 105 is described below in detail.

The TCP transfer unit 107 transfers the received packet to the sink 40 which requests distribution according to the TCP.

The UDP transfer unit 109 reads data from the ring buffer and transfers the read data to the sink 50 which requests distribution according to the UDP. A ring buffer read process in the UDP transfer unit 109 is described below in detail.

Figure 5:
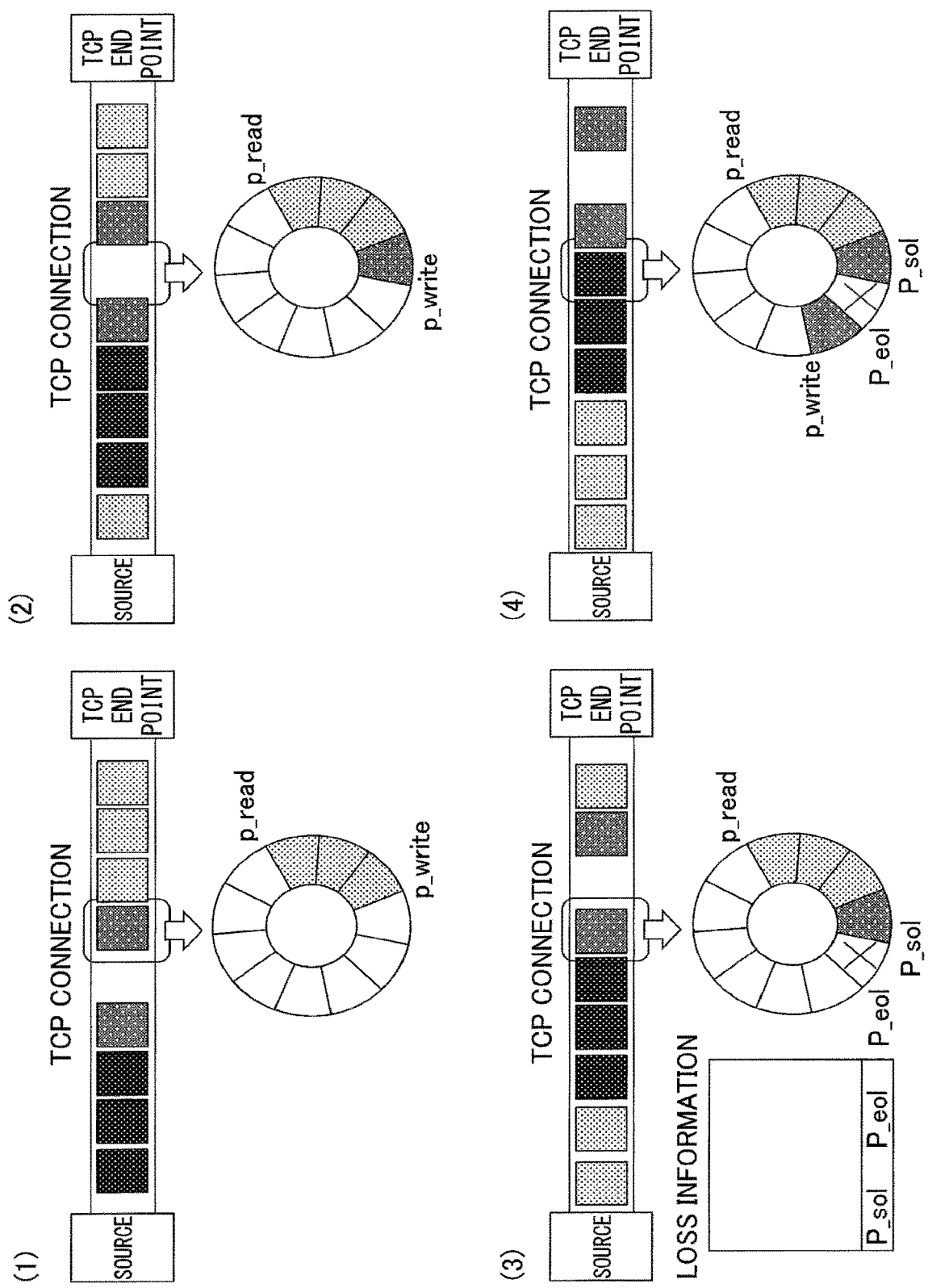
FIG. 5 is a diagram illustrating an outline of a ring buffer storage process.
Figure 6:
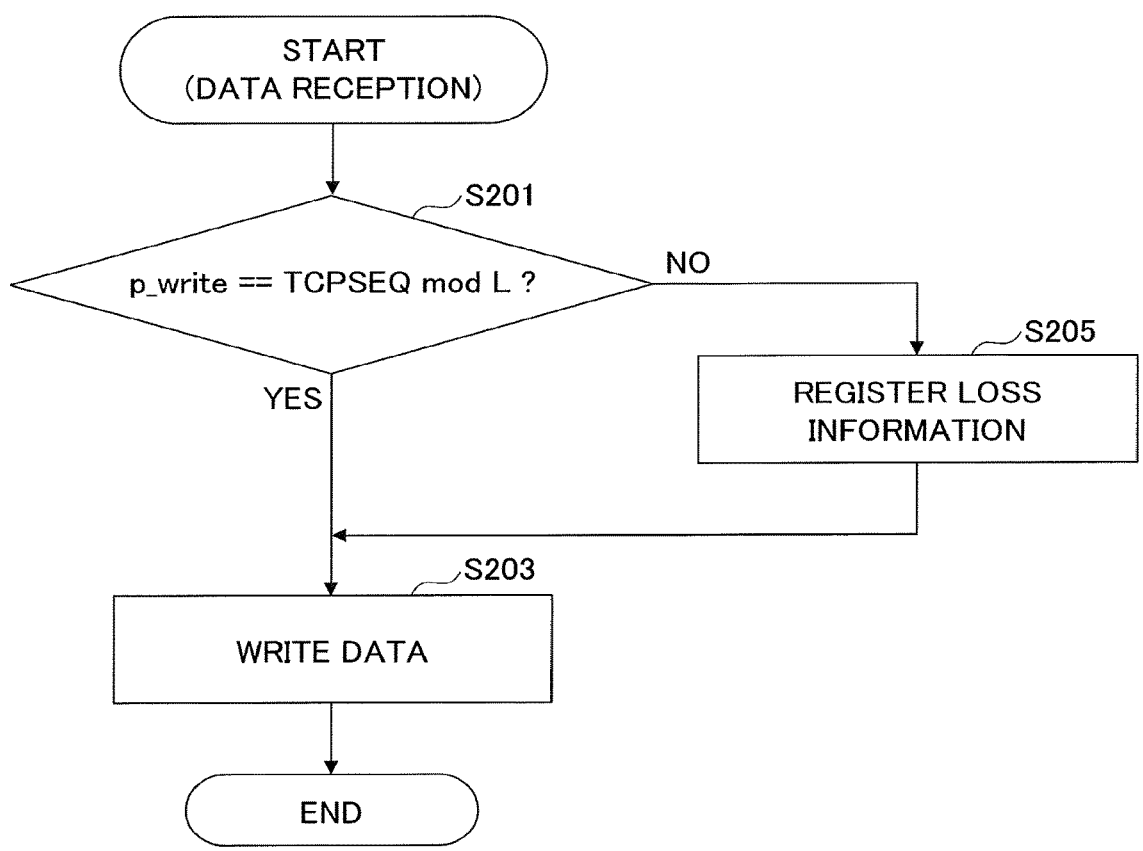
FIG. 6 is a flowchart illustrating a ring buffer storage process.

FIG. 5 is a diagram illustrating an outline of a ring buffer storage process and FIG. 6 is a flowchart illustrating the ring buffer storage process.

The storage unit 105 generates a ring buffer with storage areas, the number of which is a divisor L of a maximum TCP sequence number. The ring buffer includes an address p_write where data is to be written and an address p_read where data is to be read.

As illustrated in FIG. 5(1), when data is received, the storage unit 105 determines whether the write address p_write matches a value represented by (the TCP sequence number TCPSEQ of the received packet) modulo L, that is, TCPSEQ mod L (S201). If so (S201:Yes), as illustrated in FIG. 5(2), the storage unit 105 stores data included in the received packet in a storage area identified by the address p_write (S203). In this manner, the storage unit 105 stores the data in the storage area of the ring buffer represented by TCPSEQ mod L.

As illustrated in FIG. 5(3), when data to be received is not stored due to packet loss and next data is received, the storage unit 105 identifies that the write address p_write does not match TCPSEQ mod L (S201:No). In this case, the storage unit 105 stores loss information in a list or the like (S205). The loss information may be either a TCP sequence number of a packet that has not been received yet or a combination of a start address P_sol and an end address P_eol of a storage area in which data that has not been received yet is to be stored. In the following example, the loss information is represented by a combination of P_sol and P_eol. As illustrated in FIG. 5(4), the storage unit 105 stores the next data in a storage area following P_eol.

Figure 7:
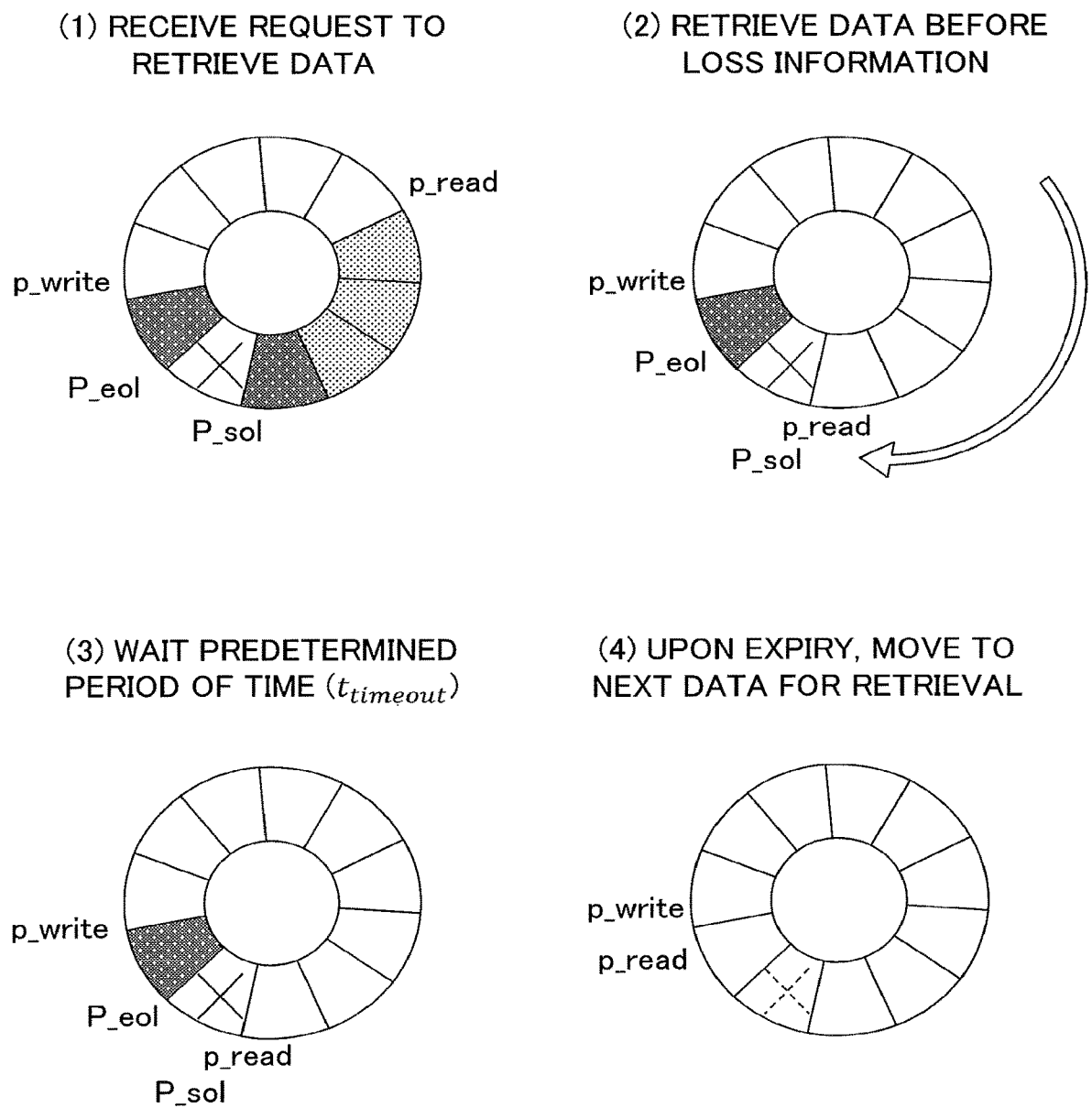
FIG. 7 is a diagram illustrating an outline of a ring buffer read process.
Figure 8:
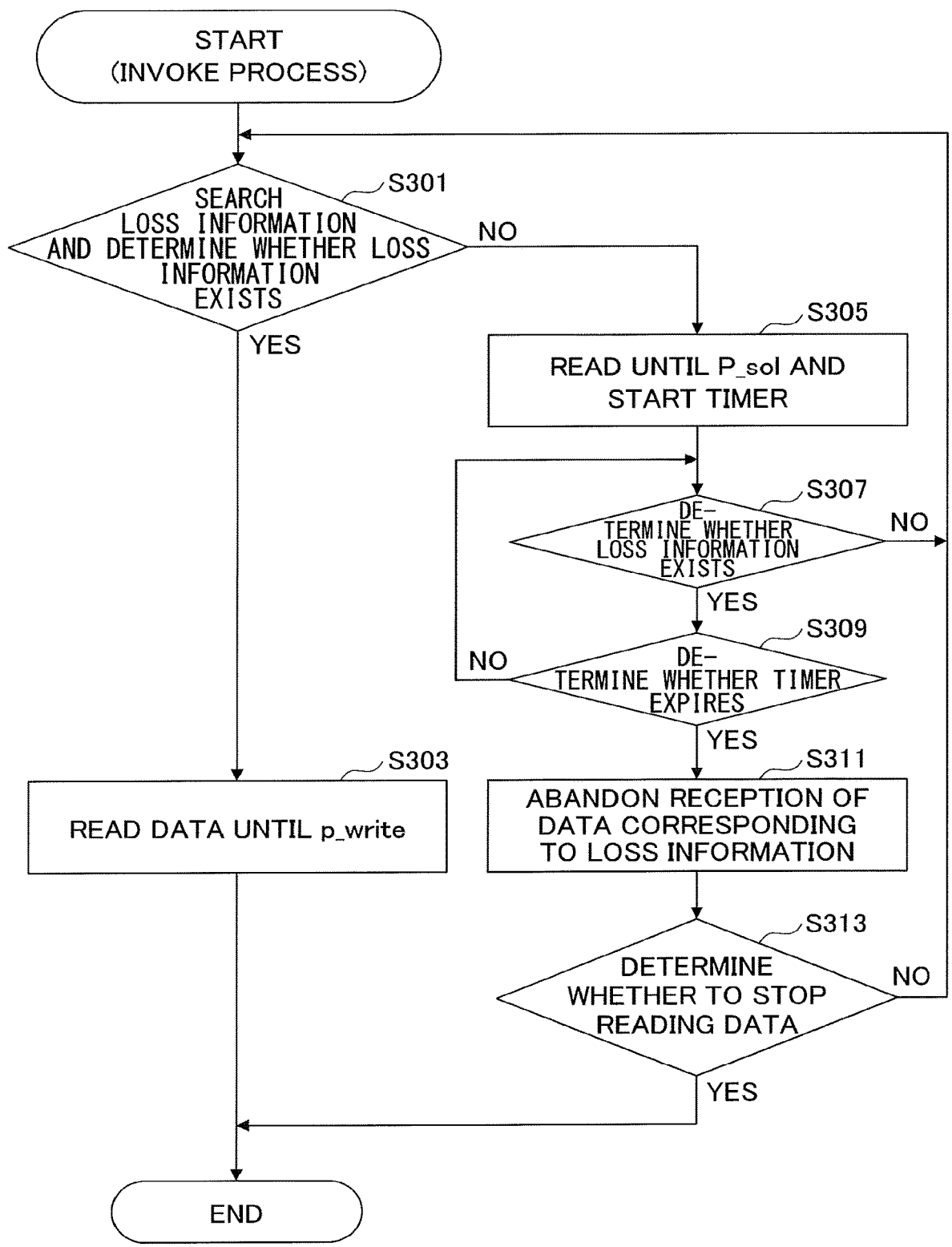
FIG. 8 is a flowchart illustrating a ring buffer read process.

FIG. 7 is a diagram illustrating an outline of a ring buffer read process and FIG. 8 is a flowchart illustrating the ring buffer read process.

As illustrated in FIG. 7(1), the UDP transfer unit 109 receives a request to read data. The UDP transfer unit 109 reads data from a storage area identified by the read address p_read of the ring buffer. FIG. 7 illustrates an example where loss information is stored. When no loss information is stored (S301:Yes), the UDP transfer unit 109 reads data until the write address p_write (S303).

As illustrated in FIG. 7(2), when loss information is stored (S301:No), the UDP transfer unit 109 reads data until the start address P_sol of the loss information (S305). Further, the UDP transfer unit 109 starts a timer that expires after a predetermined period of time, in order to wait for data corresponding to the loss information. As illustrated in FIG. 7(3), determination of whether data corresponding to the loss information is received is performed until the timer expires (S309). Before the expiry of the timer (S309:No), when data corresponding to the loss information is received (S307:No), the storage unit 105 stores the data in a storage area of the ring buffer represented by TCPSEQ mod L and deletes the start address P_sol and the end address P_eol as the loss information. When another piece of loss information is stored (S301:No), the above-mentioned procedure is repeated. When loss information is no longer stored (S301:Yes), the UDP transfer unit 109 reads data until the write address p_write.

As illustrated in FIG. 7(4), when the timer expires (S309:Yes), the UDP transfer unit 109 abandons reception of data corresponding to the loss information (S311). Then, when there is data to be read in the ring buffer (S313:No), the above-mentioned procedure is repeated.

<Effect of Embodiment>

According to an embodiment of the present invention, it is possible to transfer data on a transport layer from a single source to sinks with different communication requirements. Specifically, it is possible to support both a sink with a high-quality communication requirement and a sink with a real-time communication requirement at the same time. Further, both a workload of the source and a network load between the source and the transfer apparatus do not increase regardless of an increase in the number of sinks, and thus efficient data transfer can be achieved.

<Exemplary Hardware Configuration>

Figure 9:
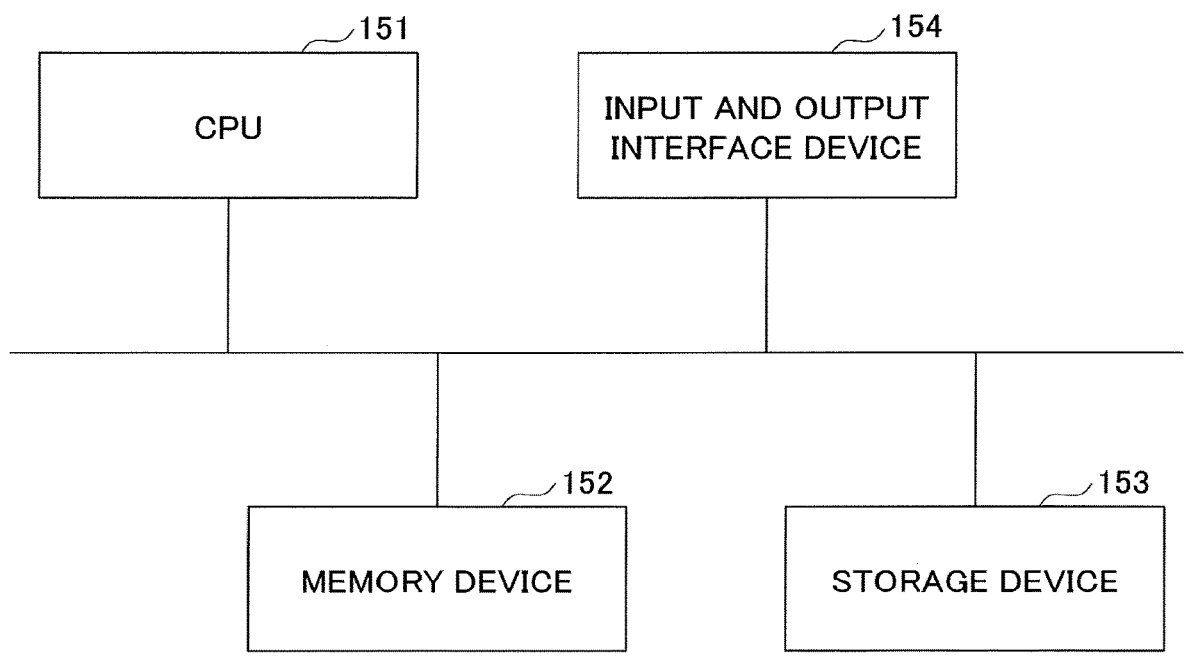
FIG. 9 is a diagram illustrating an exemplary hardware configuration of a transfer apparatus according to an embodiment of the present invention.

FIG. 9 illustrates an example of a hardware configuration of the transfer apparatus 10 according to an embodiment of the present invention. The transfer apparatus 10 may be a computer including a processor 151 such as a central processing unit (CPU), a memory device 152 such as a random access memory (RAM) or a read-only memory (ROM), a storage device 153 such as a hard disk, and so on. For example, functions and operations of the transfer apparatus 10 are realized when the CPU processes data and executes a program stored in the storage device 153 or the memory device 152. Information necessary for the transfer apparatus 10 may be input by an input and output interface device 154 and a result obtained by the transfer apparatus 10 may be output by the input and output interface device 154.

<Remarks>

For convenience of explanation, the transfer apparatus according Lo the embodiments of the present invention has been described with reference to functional block diagrams, but the transfer apparatus may be implemented in hardware, software, or combinations thereof. For example, the embodiment of the present invention may be realized by a program for causing a computer to implement each function in the transfer apparatus according to the embodiment of the present invention, a program for causing a computer to perform each step in the method according to the embodiment of the present invention, or the like. In addition, two or more functional elements may be combined as appropriate. Further, the method according to the embodiment of the present invention may be performed in a different order as illustrated in the embodiment.

While the solution is described above to transfer data on a transport layer from a single source to sinks with different communication requirements, the present invention is not limited to the embodiments, but various modifications and applications can be made by those skilled in the art within the scope of the claims.

The present international application is based on and claims priority to Japanese Patent Application No. 2017-019890 filed on Feb. 6, 2017, the entire contents of which are hereby incorporated by reference.

DESCRIPTION OF NOTATIONS

10 transfer apparatus
20 transfer apparatus
30 source 40 sink
50 sink
101 reception unit
103 destination determination unit
105 storage unit
107 TCP transfer unit
109 UDP transfer unit
151 CPU
152 memory device
153 storage device
154 input and output interface device

The invention claimed is:

1. A transfer apparatus, comprising:
processing circuitry configured to
receive a packet from a source which distributes data according to a transmission control protocol (TCP);
store data included in the received packet in a buffer based on a TCP sequence number of the received packet;
transfer the received packet to a first sink which requests distribution according to the TCP; and
read the data from the buffer and transfer the read data to a second sink which requests distribution according to a user datagram protocol (UDP),
wherein when it is determined that there is data that has not been received yet based on the TCP sequence number, the processing circuitry stores loss information indicating existence of data that has not been received yet, and
wherein when the loss information is stored, the processing circuitry reads data received before the loss information from the buffer, which is data that is sequentially numbered before data that has not been received yet based on the TCP sequence number, and if data corresponding to the loss information is not received even after waiting a predetermined period of time, the processing circuitry reads data received after the loss information from the buffer.

2. The transfer apparatus as claimed in claim 1, wherein the processing circuitry generates, as the buffer for storing the data included in the received packet, a ring buffer with storage areas, a number of the storage areas being a divisor L of a maximum TCP sequence number, and stores the data included in the received packet in a storage area corresponding to a value represented by (the TCP sequence number of the received packet) modulo L.

3. A transfer method in a transfer apparatus for transferring data from a source which distributes data according to a transmission control protocol (TCP) to a plurality of sinks which process the distributed data, comprising steps of:
receiving a packet from the source;
storing data included in the received packet in a buffer based on a TCP sequence number of the received packet;
transferring the received packet to a first sink which requests distribution according to the TCP; and
reading the data from the buffer and transferring the read data to a second sink which requests distribution according to a user datagram protocol (UDP),
determining that there is data that has not been received yet based on the TCP sequence number,
storing loss information indicating existence of data that has not been received yet, and
data received before the loss information from the buffer, which is data that is sequentially numbered before data that has not been received yet based on the TCP sequence number, and after detecting data corresponding to the loss information is not received even after waiting a predetermined period of time, reading data received after the loss information from the buffer.

4. A non-transitory computer-readable recording medium having a program stored thereon for causing a computer to execute a transfer method, for transferring data from a source which distributes data according to a transmission control protocol (TCP) to a plurality of sinks which process the distributed data, comprising:
receiving a packet from the source;
storing data included in the received packet in a buffer based on a TCP sequence number of the received packet;
transferring the received packet to a first sink which requests distribution according to the TCP; and
reading the data from the buffer and transferring the read data to a second sink which requests distribution according to a user datagram protocol (UDP),
determining that there is data that has not been received yet based on the TCP sequence number,
storing loss information indicating existence of data that has not been received yet, and
reading data received before the loss information from the buffer, which is data that is sequentially numbered before data that has not been received yet based on the TCP sequence number, and after detecting data corresponding to the loss information is not received even after waiting a predetermined period of time, reading data received after the loss information from the buffer.

* * * * *